US012589726B2

(12) United States Patent
Zarringhalam et al.

(10) Patent No.: US 12,589,726 B2
(45) Date of Patent: Mar. 31, 2026

(54) SYSTEM AND METHOD OF STANDSTILL ENGAGEMENT OF STEERING SYSTEM

(71) Applicant: GM Global Technology Operations LLC, Detroit, MI (US)

(72) Inventors: Reza Zarringhalam, Whitby (CA); Mohammadali Shahriari, Markham (CA); Jimmy Lu, Stouffville (CA); Hassan Askari, Thornhill (CA); Khizar Ahmad Qureshi, Pickering (CA); Ami Woo, Calgary (CA); Amirreza Mirbeygi Moghaddam, Toronto (CA)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 18/441,310

(22) Filed: Feb. 14, 2024

(65) Prior Publication Data

US 2025/0256699 A1     Aug. 14, 2025

(51) Int. Cl.
*B60W 10/20*        (2006.01)
*B60W 50/00*        (2006.01)
(Continued)

(52) U.S. Cl.
CPC ........ *B60W 10/20* (2013.01); *B60W 50/0097* (2013.01); *B60W 50/045* (2013.01);
(Continued)

(58) Field of Classification Search
CPC ............. B60W 10/20; B60W 50/0097; B60W 50/045; B60W 60/0011; B60W 60/0051;
(Continued)

(56) References Cited

U.S. PATENT DOCUMENTS

| | | | |
|---|---|---|---|
| 2009/0037062 A1 | 2/2009 | Lee et al. | |
| 2013/0179038 A1* | 7/2013 | Goswami ................ | B62D 5/04 701/42 |

(Continued)

FOREIGN PATENT DOCUMENTS

| | | | |
|---|---|---|---|
| CN | 105005196 A | * 10/2015 | |
| DE | 112020001409 T5 | 12/2021 | |

(Continued)

OTHER PUBLICATIONS

English translation of WO 2012041670 (Year: 2012).*
English translation of CN 105005196 (Year: 2015).*

*Primary Examiner* — Joseph J Dallo
(74) *Attorney, Agent, or Firm* — Honigman LLP; Matthew H. Szalach; Jonathan P. O'Brien

(57) ABSTRACT

A computer-implemented method that, when executed by data processing hardware, causes the data processing hardware to perform operations comprising detecting a request to enable an automated driving system of a vehicle while the vehicle is at rest or at a low speed, determining an intended path of the vehicle, determining an initial steering angle, calculating a desired steering angle based on the intended path, calculating a commanded steering angle, evaluating the initial steering angle versus the desired steering angle, and either (i) initiating a driving maneuver with the initial steering angle, or (ii) adjusting the steering angle based on the commanded steering angle before initiating the driving maneuver.

20 Claims, 5 Drawing Sheets

(51) Int. Cl.
  *B60W 50/04*   (2006.01)
  *B60W 60/00*   (2020.01)
(52) U.S. Cl.
  CPC .... *B60W 60/0011* (2020.02); *B60W 60/0051*
    (2020.02); *B60W 2050/0054* (2013.01); *B60W*
    *60/0053* (2020.02); *B60W 2540/18* (2013.01)
(58) Field of Classification Search
  CPC ..... B60W 60/0053; B60W 2050/0054; B60W
               2540/18
  See application file for complete search history.

(56)      References Cited

U.S. PATENT DOCUMENTS

| | | | |
|---|---|---|---|
| 2020/0023695 A1* | 1/2020 | Niewiadomski ..... | G05D 1/0225 |
| 2020/0148018 A1* | 5/2020 | Lavoie ................. | G05D 1/0257 |
| 2022/0126915 A1* | 4/2022 | Conrad ................. | B60W 50/14 |
| 2022/0274644 A1* | 9/2022 | Johansson ....... | B60W 30/18036 |
| 2022/0410872 A1* | 12/2022 | Salter ..................... | B60L 53/66 |
| 2024/0317255 A1* | 9/2024 | Mocherla ........... | B60W 60/001 |

FOREIGN PATENT DOCUMENTS

| | | | |
|---|---|---|---|
| DE | 112020001530 T5 | 2/2022 | |
| WO | WO-2012041670 A1 * | 4/2012 | ........... B62D 15/028 |
| WO | WO-2022175475 A1 * | 8/2022 | ........... B60W 30/06 |

* cited by examiner

SYSTEM AND METHOD OF STANDSTILL ENGAGEMENT OF STEERING SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a system and method for determining whether engagement of a steering system of a vehicle at standstill or low speed is necessary before a driving maneuver is initiated.

Vehicles are often equipped with automated driving systems that may be enabled while the vehicle is at rest (i.e., standstill) or traveling at low speeds. Upon enabling the automated driving system, a steering angle (i.e., road wheel angle) of the vehicle oftentimes does not align with or is not commensurate with the steering angle that would provide for good trajectory following with respect to an intended path set forth by the automated driving system. The shortcomings of existing systems and methods are addressed by principles of the present disclosure.

SUMMARY

One aspect of the disclosure provides a computer-implemented method that, when executed by data processing hardware, causes the data processing hardware to perform operations. These operations include detecting a request to enable an automated driving system of a vehicle while the vehicle is at rest or at a low speed, determining an intended path of the vehicle, determining an initial steering angle, calculating a desired steering angle based on the intended path, calculating a commanded steering angle, evaluating the initial steering angle versus the desired steering angle, and either (i) initiating a driving maneuver with the initial steering angle, or (ii) adjusting the steering angle based on the commanded steering angle before initiating the driving maneuver.

Implementations of the disclosure may include one or more of the following optional features. For example, adjusting the steering angle may further include a vehicle steering system that is configured for adjusting the initial steering angle before initiating the driving maneuver.

In some implementations, adjusting the steering angle before initiating the driving maneuver may include instructing an operator of the vehicle to manually adjust the initial steering angle based on the commanded steering angle before initiating the driving maneuver.

In some examples, the method may further include evaluating a path tracking quality index. When the path tracking quality index is between a first threshold and a second threshold the driving maneuver may be initiated with the initial steering angle. When the path tracking quality index is between a second threshold and a third threshold, a vehicle steering system configured to adjust the steering angle may adjust the steering angle based on the commanded steering angle before the driving maneuver is initiated. When the path tracking quality index is greater than a fourth threshold and less than a third threshold a vehicle management system configured to instruct an operator of the vehicle may instruct the operator to manually adjust the steering angle based on the commanded steering angle before the driving maneuver is initiated.

According to at least one aspect, evaluating the path tracking quality index may be a function of predicted future vehicle states and intended future trajectory.

According to an example, evaluating the path tracking quality index may further include assessing the initial steering angle of the vehicle using a predictive controller and a low-speed vehicle model.

Another aspect of the disclosure provides a system having data processing hardware and memory hardware in communication with the data processing hardware, the memory hardware storing instructions that, when executed on the data processing hardware, cause the data processing hardware to perform operations. These operations include detecting a request to enable an automated driving system of a vehicle while the vehicle is at rest or at a low speed, determining an intended path of the vehicle, determining an initial steering angle, calculating a desired steering angle based on the intended path, calculating a commanded steering angle, evaluating the initial steering angle versus the desired steering angle, and either (i) initiating a driving maneuver with the initial steering angle, or (ii) adjusting the steering angle based on the commanded steering angle before initiating the driving maneuver.

Implementations of the disclosure may include one or more of the following optional features. For example, adjusting the steering angle may further include a vehicle steering system that is configured for adjusting the initial steering angle before initiating the driving maneuver.

In some implementations, adjusting the steering angle before initiating the driving maneuver may include instructing an operator of the vehicle to manually adjust the initial steering angle based on the commanded steering angle before initiating the driving maneuver.

In some examples, the system may further include evaluating a path tracking quality index. When the path tracking quality index is between a first threshold and a second threshold the driving maneuver may be initiated with the initial steering angle. When the path tracking quality index is less than a second threshold and greater than or equal to a third threshold, a vehicle steering system configured to adjust the steering angle may adjust the steering angle based on the commanded steering angle before the driving maneuver is initiated. When the path tracking quality index is greater than a fourth threshold and less than a third threshold a vehicle management system configured to instruct an operator of the vehicle may instruct the operator to manually adjust the steering angle based on the commanded steering angle before the driving maneuver is initiated.

An additional aspect of the disclosure provides a vehicle management system. The vehicle management system includes a steering system configured to adjust a steering angle of a vehicle, data processing hardware, and memory hardware in communication with the data processing hardware, the memory hardware storing instructions that, when executed on the data processing hardware, cause the data processing hardware to perform operations. These operations include detecting a request to enable an automated driving system of a vehicle while the vehicle is at rest or at a low speed, determining an intended path of the vehicle, determining an initial steering angle, calculating a desired steering angle based on the intended path, calculating a commanded steering angle, evaluating the initial steering angle versus the desired steering angle, and either (i) initiating a driving maneuver with the initial steering angle, or (ii) adjusting the steering angle before initiating the driving maneuver.

Implementations of the disclosure may include one or more of the following optional features. For example, adjusting the steering angle before initiating the driving maneuver comprises instructing an operator of the vehicle to manually adjust the initial steering angle based on the commanded steering angle before initiating the driving maneuver.

In some implementations, the vehicle management system further includes evaluating a path tracking quality index. When the path tracking quality index is between a first threshold and a second threshold the driving maneuver may be initiated with the initial steering angle. When the path tracking quality index is less than the second threshold and greater than or equal to a third threshold, a vehicle steering system configured to adjust the steering angle may adjust the steering angle based on the commanded steering angle before the driving maneuver is initiated. When the path tracking quality index is greater than a fourth threshold and less than the third threshold, a vehicle management system configured to instruct an operator of the vehicle may instruct the operator to manually adjust the steering angle based on the commanded steering angle before the driving maneuver is initiated.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
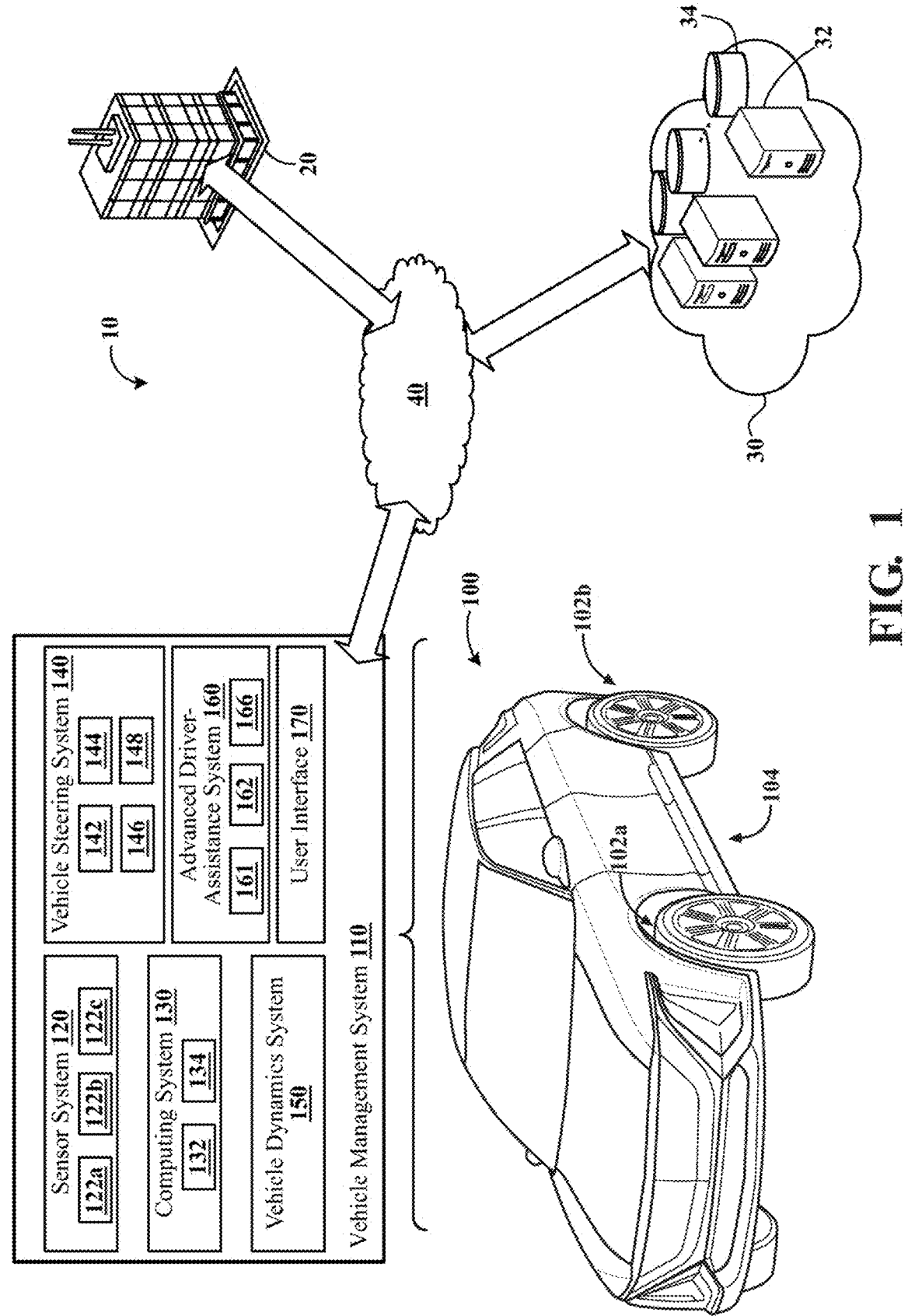
FIG. 1 is a schematic diagram of a vehicle environment including a vehicle and a vehicle management system of the vehicle according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof.

These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, an example vehicle operating environment 10 is provided for illustration of the principles of the present disclosure. The vehicle operating environment 10 includes a vehicle 100 and a vehicle service center 20. For the sake of illustration, the vehicle operating environment 10 is shown as including a single vehicle service center 20. However, in other examples, the vehicle operating environment 10 may include a plurality of vehicle service centers 20 in communication over a network 40 (e.g., the Internet, cellular networks).

The vehicle 100 includes a vehicle management system 110, a sensor system 120, a steering system 140, a vehicle dynamics system 150, and an advanced driver-assistance system (ADAS) 160. While the vehicle 100 maneuvers about the environment 10, the sensor system 120 includes various sensor subsystems 122, 122*a*-122*c* configured to gather sensor data 123, 123*a*-123*c* relating to characteristics of the environment 10 and/or a status of the vehicle 100. For instance, the sensor subsystems 122 include a vehicle exterior sensor subsystem 122*a* configured to measure or obtain external environmental data 123*a*, such as lane markings or surrounding objects (e.g., vehicles, pedestrians), an interior sensor subsystem 122*b* configured to measure interior environmental data 123*b*, such as vehicle occupancy, and/or an ADAS sensor subsystem 122*c* configured to measure or obtain vehicle operating data 123*c*, such as operating parameters. The ADAS sensor subsystem 122*c* can include an inertial measurement unit (IMU), one or more wheel speed sensors, as well as other sensors for obtaining vehicle operating data such as wheel speed, steering wheel position, yaw rate, and lateral acceleration. As the sensor system 120 gathers the sensor data 123, a computing system 130 is configured to store, process, and/or communicate the sensor data 123 within the vehicle operating environment 10. In order to perform computing tasks related to the sensor data 123, the computing system 130 of the vehicle 100 includes data processing hardware 132 and memory hardware 134. The data processing hardware 132 is configured to execute instructions stored in the memory hardware 134 to perform computing tasks related to operation and management of the vehicle 100. Generally speaking, the computing system 130 refers to one or more locations of data processing hardware 132 and/or memory hardware 134.

In some examples, the computing system 130 is a local system located on the vehicle 100. When located on the vehicle 100, the computing system 130 may be centralized (i.e., in a single location/area on the vehicle 100, for example, a vehicle control unit), decentralized (i.e., located at various locations about the vehicle 100), or a hybrid combination of both (e.g., with a majority of centralized hardware and a minority of decentralized hardware). To illustrate some differences, a decentralized computing system 130 may allow processing to occur at an activity location while a centralized computing system 130 may allow for a central processing hub that communicates to systems located at various positions on the vehicle 100.

Additionally or alternatively, the computing system 130 includes computing resources that are located remotely from the vehicle 100. For instance, the computing system 130 may communicate via the network 40 with a remote vehicle computing system 30 (e.g., a remote computer/server or a cloud-based environment). Much like the computing system 130, the remote vehicle computing system 30 includes remote computing resources such as remote data processing hardware 32 and remote memory hardware 34. Here, sensor data 123 or other processed data (e.g., data processed locally by the computing system 130) may be stored in the remote vehicle computing system 30 and may be accessible to the computing system 130. In some examples, the computing system 130 is configured to utilize the remote resources 32, 34 as extensions of the computing resources 132, 134 such that resources of the computing system 130 may reside on resources of the remote vehicle computing system 30.

With reference to FIG. 1, one or more wheels 102 (i.e., front wheels 102*a* and rear wheels 102*b*) are coupled to a suspension 104 the vehicle 100. The steering system 140 is capable of monitoring and controlling the positon and/or direction of the wheels 102. For instance, the steering system 140 can include a steering column 142 coupled to the suspension 104 and a steering wheel 144 coupled to the steering column 142. The steering system 140 may include one or more additional components such as a steering box 146 and steering gear 148 so that torque can be applied to the steering column 143, whether that be by a motor coupled to the steering column 142 or by a driver through the steering wheel 144, to maintain control and position of the front wheels 102*a*.

Figure 2A:
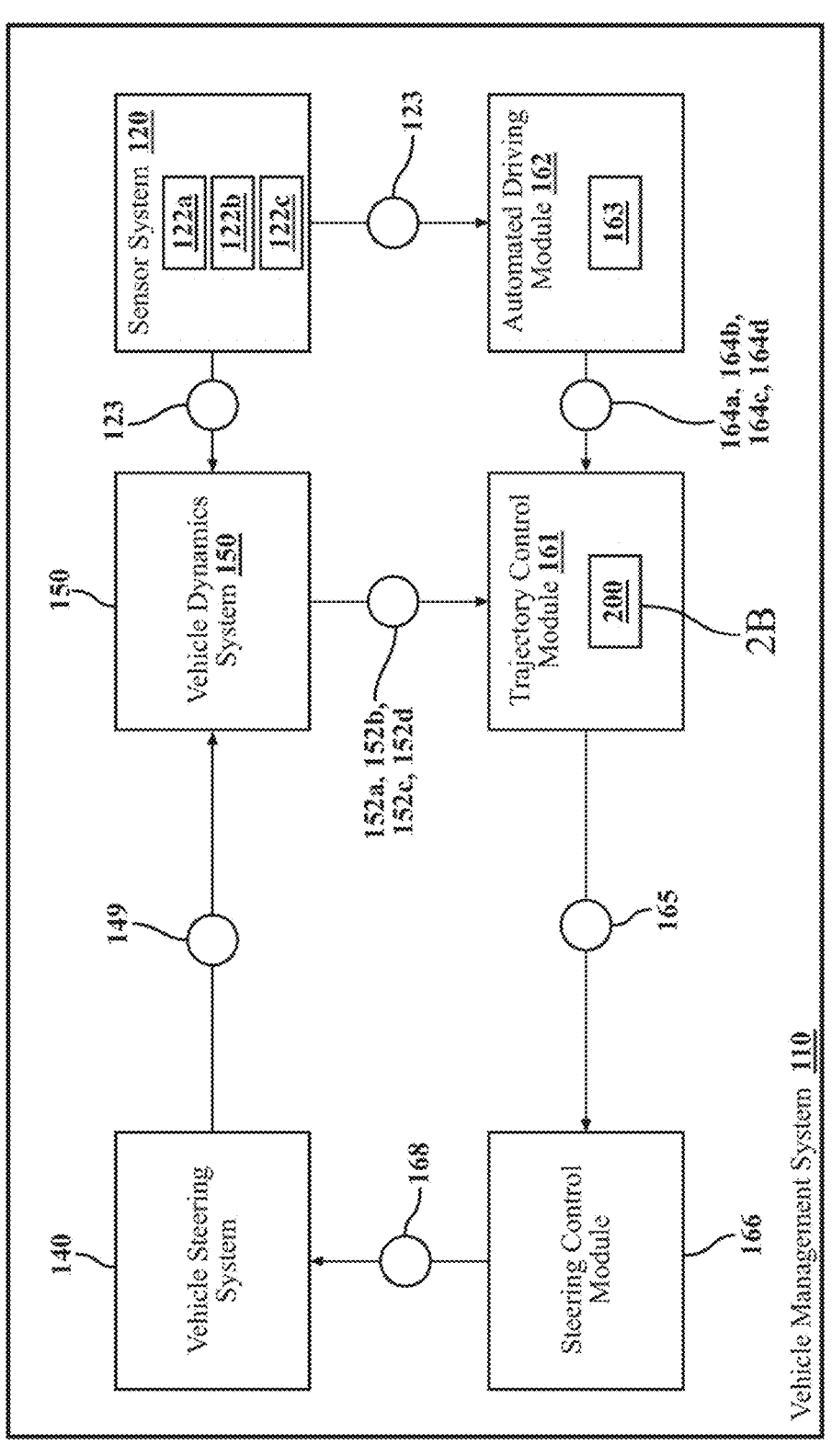
FIG. 2A is an enlarged schematic diagram showing an example of the vehicle management system according to the principles of the present disclosure.
Figure 2B:
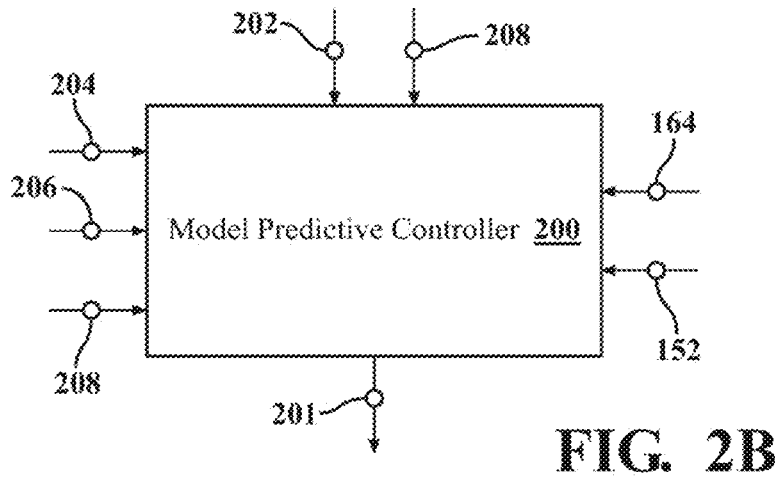
FIG. 2B is an enlarged schematic diagram of a model predictive controller of FIG. 2A.

The vehicle dynamics control system 150 is capable of monitoring and controlling one or more electronic aspects of the vehicle 100, such as continuously monitoring and/or controlling a state 152 of the vehicle 100, as shown in FIG. 2A. The steering system 140 can provide an actual road wheel angle 149 as an input to the vehicle dynamics control system 150, which can change the state 152 of the vehicle 100. The state 152 can include a lateral position 152*a*, a rate of lateral position 152*b*, a heading 152*c*, and/or a rate of heading change 152*d*, for example.

The ADAS 160 is capable of monitoring and controlling one or more electronic aspects of the vehicle 100. For instance, the ADAS 160 can monitor and control one or more subsystems of the vehicle 100, such as the steering system 140. In other words, the ADAS 160 can communicate with the steering system 140 to maintain good trajectory following after a vehicle automated driving system is enabled by the driver while the vehicle 100 is at rest or at a low speed, for example. With reference to FIGS. 1 and 2A, the ADAS 160 may include one or more modules for determining one or more operating parameters of the vehicle 100. For instance, the ADAS 160 may be configured to include a trajectory control module 161, an automated driving module 162, and a steering control module 166. The automated driving module 162 may be configured to communicate with the sensor system 120 and provide a planned or intended path 163 for the vehicle 100. The planned path 163 may be accompanied with a reference trajectory 164, 164*a*-164*d*, which may be provided as an input to the trajectory control module 161. The trajectory control module 161 can receive the state 152, 152*a*-152*d* from the vehicle dynamics control system 150 and the reference trajectory 164, 164*a*-164*d* from the automated driving module 162 and calculate a commanded steering angle 165. The commanded steering angle 165 can be provided to the steering control module 166 for calculating a torque 168 for the steering system 140. The steering system 140 can change the calculated torque 168 and adjust the road wheel angle 149 accordingly.

The automated driving module 162 may be enabled by the driver or otherwise while the vehicle 100 is at rest or while traveling at low speeds so an initial road wheel angle 149*a* may be different than a desired or calculated steering angle 201 (discussed in more detail below). In some instances, if the vehicle 100 were to initiate travel with the initial road wheel angle 149*a*, the vehicle 100 may deviate from the intended path 163 provided by the automated driving module 162. Thus, as will be discussed below, the commanded steering angle 165 may be calculated so that the road wheel angle 149 may be adjusted by the steering system 140 before the vehicle or driver initiates travel.

With reference to FIG. 2A, the commanded steering angle 165 can be calculated using a controller, such as model predictive controller (MPC) 200. The model predictive controller 200 can be configured with constraints 202, a low speed plant model 204, as well as weights and horizons 206. The constraints 202 may be desirable for maintaining the position of the vehicle 100 within a lane on a road and/or prevent the vehicle 100 from traveling off the road. In general, the low speed plant model 204 is a model of the vehicle 100, which can help make predictions about behavior (e.g., trajectory following) of the vehicle 100. The weights and horizons 206 may be calibrated and used by the MPC 200 and, more particularly, by a cost equation 208 to determine which predicted path (i.e., commanded steering angle) is desirable for the vehicle 100. Cost V may be calculated using the following equation:

$$V = \frac{1}{2}\sum_{k=1}^{p}\{(y - y_{ref})^2 W_y + (u - u_{ref})^2 W_u + (u_k - u_{k-1})^2 W_{\Delta u} + \in^2 W_\in\}$$

Cost V may be referred to as a weighted square sum of one or more variables or the sum of the input, output, input rate, and slack variable, for example. In the present example, the input can be the road wheel angle 149 and the output can be the lateral position 152a, the rate of lateral position 152b, the heading 152c, and the rate of heading change 152d of the vehicle 100. The slack variable may be provided so that the lateral position 152a, the rate of lateral position 152b, the heading 152c, and the rate of heading change 152d tracks or is close to the desired reference value for the lateral position 164b.

A path tracking quality index (PTQI) 210 may also be used to determine whether it is necessary to adjust the road wheel angle 149 before engagement of the automated driving system. In the present example, the PTQI 210 is a non-dimensional nominal value (i.e., 0 to 1). PTQI 210 may be determined using the following equation:

$$PTQI = \left(1 - w_1\frac{y_m}{y_{engage}}\right) \times \left(1 - w_2\frac{t_m}{t_{max}}\right) \times \left(1 - w_3\frac{abs(\delta_0 - \delta_{opt})}{abs(max(\delta_0, \delta_{opt}))}\right)$$

PTQI 210 may be referred to as a product of lateral deviation, merge time, and steering angle. $y_m$ may be referred to as a maximum distance to a nominal path. $y_{engage}$ may be referred to as a maximum distance threshold for engaging. $t_m$ may be referred to as the time taken to merge with the desired path depending on system inertia and road condition (e.g., bank, grade, and surface friction). $t_{max}$ may be referred to as a maximum allowed time to merge with the desired path. $\delta_0$ may be used to refer to the initial road wheel angle 149a and $\delta_{opt}$ may be used to refer to the calculated steering angle 201. $w_1$, $w_2$, $w_3$, are weights that may be referred to as a relevance factor of each parameter. These weights should sum up to one (1) and may be adjusted or calibrated as necessary.

Figure 3A:
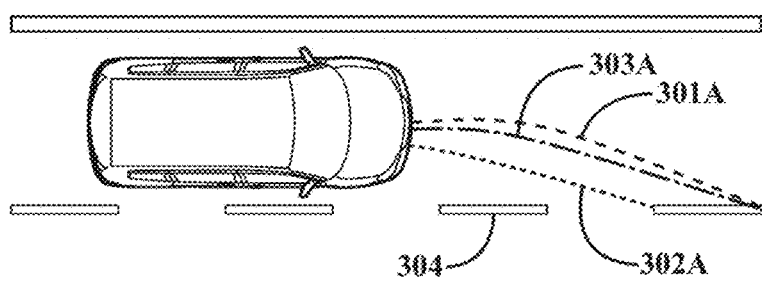
FIG. 3A is a top view of the vehicle of FIG. 1 on a road according to the principles of the present disclosure.

With reference to FIG. 3A, a first path 301A of the vehicle 100 to a center of a lane 304 is shown based on the initial road wheel angle 149a, a second path 302A of the vehicle 100 to the center of the lane 304 is shown based on the calculated steering angle 201, and a third path 303A of the vehicle 100 to the center of the lane 304 is shown based on the commanded steering angle 165. In general, if the difference between the first path 301A and the second path 302A is not significant and lane excursion is unlikely, then the steering system 140 may use to the initial road wheel angle 149a because engaging the vehicle steering system 140 based on the commanded steering angle 165 would not result in a significant change in the state 152 of the vehicle 100. PTQI 210 may be used to determine whether standstill engagement of the steering system 140 or driver intervention is necessary to modify the steering angle. If PTQI 210 is less than or equal to a first threshold (e.g., 1) and greater than a second threshold (e.g., 0.75) or between the first and second thresholds and one (1), a driving maneuver with the initial road wheel angle 149a may be initiated because good trajectory following of the intended path 163 is likely, for example.

Figure 3B:
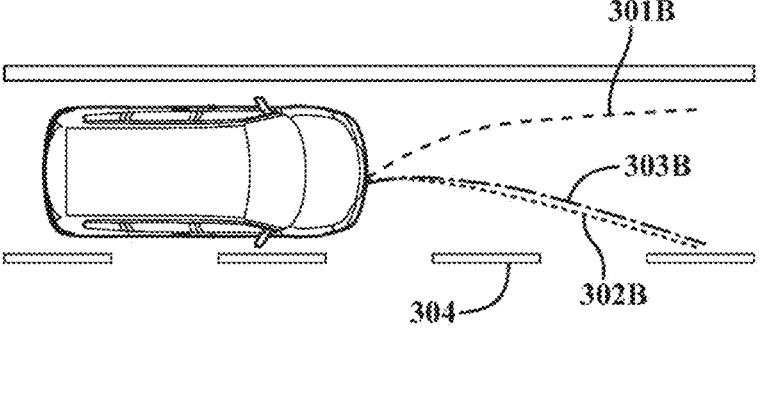
FIG. 3B is a top view of the vehicle of FIG. 1 on a road according to the principles of the present disclosure.

With reference to FIG. 3B, a first path 301B of the vehicle 100 to the center of the lane 304 is shown based on the initial road wheel angle 149a, a second path 302B of the vehicle 100 to the center of the lane 304 is shown based on the calculated steering angle 201, and a third path 303B of the vehicle 100 to the center of the lane 304 is shown based on the commanded steering angle 165. In general, if the difference between the first path 301B and the second path 302B is significant and lane excursion is possible, then engaging the steering system 140 based on the commanded steering angle 165 may be desirable so that good trajectory following of the vehicle 100 may be maintained. PTQI 210 may be used to determine whether standstill engagement of the steering system 140 or driver intervention is necessary to modify the steering angle. If PTQI 210 is less than the second threshold (e.g., 0.75) and greater than or equal to a third threshold (e.g., 0.50) or between the second and third threshold, the steering control module 166 may provide the torque 168 to steering system 140 based on the commanded steering angle 165 before initiating a driving maneuver.

Figure 3C:
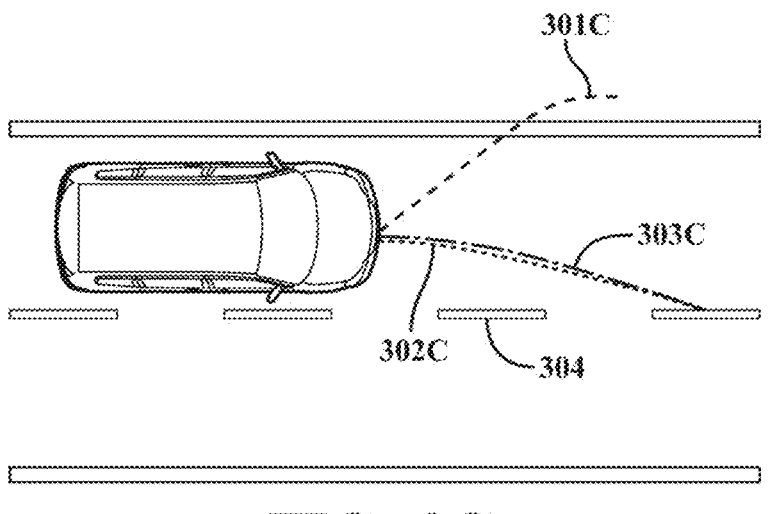
FIG. 3C is a top view of the vehicle of FIG. 1 on a road according to the principles of the present disclosure.

With reference to FIG. 3C, a first path 301C of the vehicle 100 to the center of the lane 304 is shown based on the initial road wheel angle 149a, a second path 302C of the vehicle 100 to the center of the lane 304 is shown based on the calculated steering angle 201, and a third path 303C of the vehicle 100 to the center of the lane 304 is shown based on the commanded steering angle 165. In general, if the difference between the first path 301C and the second path 302C is excessive and lane excursion is likely, then, in the present example, engaging the steering system 140 based on the commanded steering angle 165 may be desirable so that good trajectory following of the vehicle 100 may be maintained. In this example, engaging the steering system 140 may require the driver of the vehicle 100 to adjust the steering wheel 144. PTQI 210 may be used to determine whether standstill engagement of the steering system 140 or driver intervention is necessary to modify the steering angle. If PTQI 210 is less than the third threshold (e.g., 0.50) and greater than or equal to a fourth threshold (e.g., 0), the operator or driver may need to apply torque to the steering system 140 via the steering wheel 144 based on the commanded steering angle 165 before initiating a drive maneuver. The vehicle management system may be configured to instruct the driver of the vehicle 100 via the user interface 170 to manually adjust the steering angle to the commanded steering angle 165 via the steering wheel 144.

Additionally or alternatively, the path tracking quality index may be defined as a function of predicted future vehicle states (e.g., lateral position, rate of lateral position, heading, and rate of heading change) and intended future trajectory (e.g., right turn, left turn, straight, etc.).

Figure 3D:
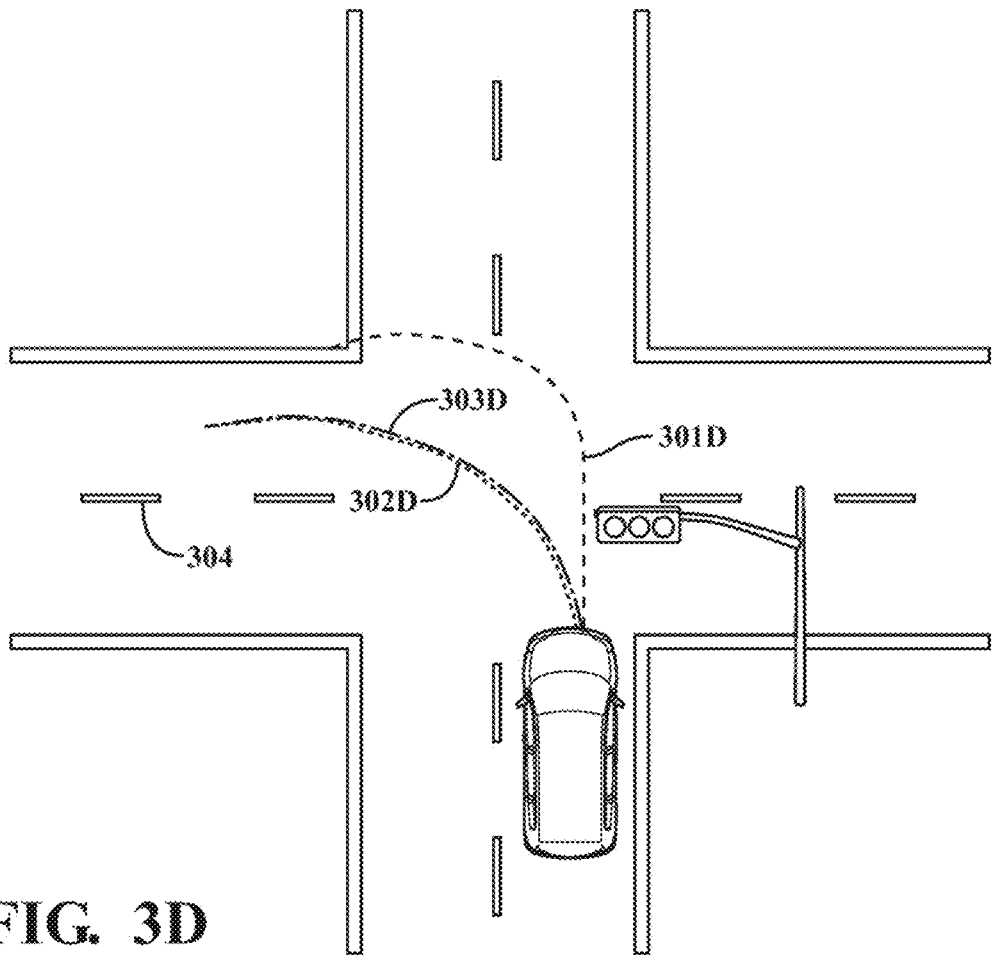
FIG. 3D is a top view of the vehicle of FIG. 1 at an intersection according to the principles of the present disclosure.

With reference to FIG. 3D, situational awareness of the vehicle 100 may be desirable to engage the steering system 140. For example, when the vehicle 100 is at an intersection in a left hand turn lane, it may be desirable to engage the steering system 140 so that the vehicle 100 can exhibit good trajectory following as it initiates a driving maneuver to complete a left hand turn. As shown in FIG. 3D, a first path 301D of the vehicle 100 to the center of the lane 304 is shown based on the initial road wheel angle 149a, a second path 302D of the vehicle 100 to the center of the lane 304 is shown based on the calculated steering angle 201, and a third path 303D of the vehicle 100 to the center of the lane 304 is shown based on the commanded steering angle 165. In general, if the difference between the first path 301D and the second path 302D is excessive and significant path deviation is likely, then, in the present example, engaging the steering system 140 based on the commanded steering angle 165 may be desirable so that good trajectory following of the vehicle 100 may be maintained.

Figure 4:
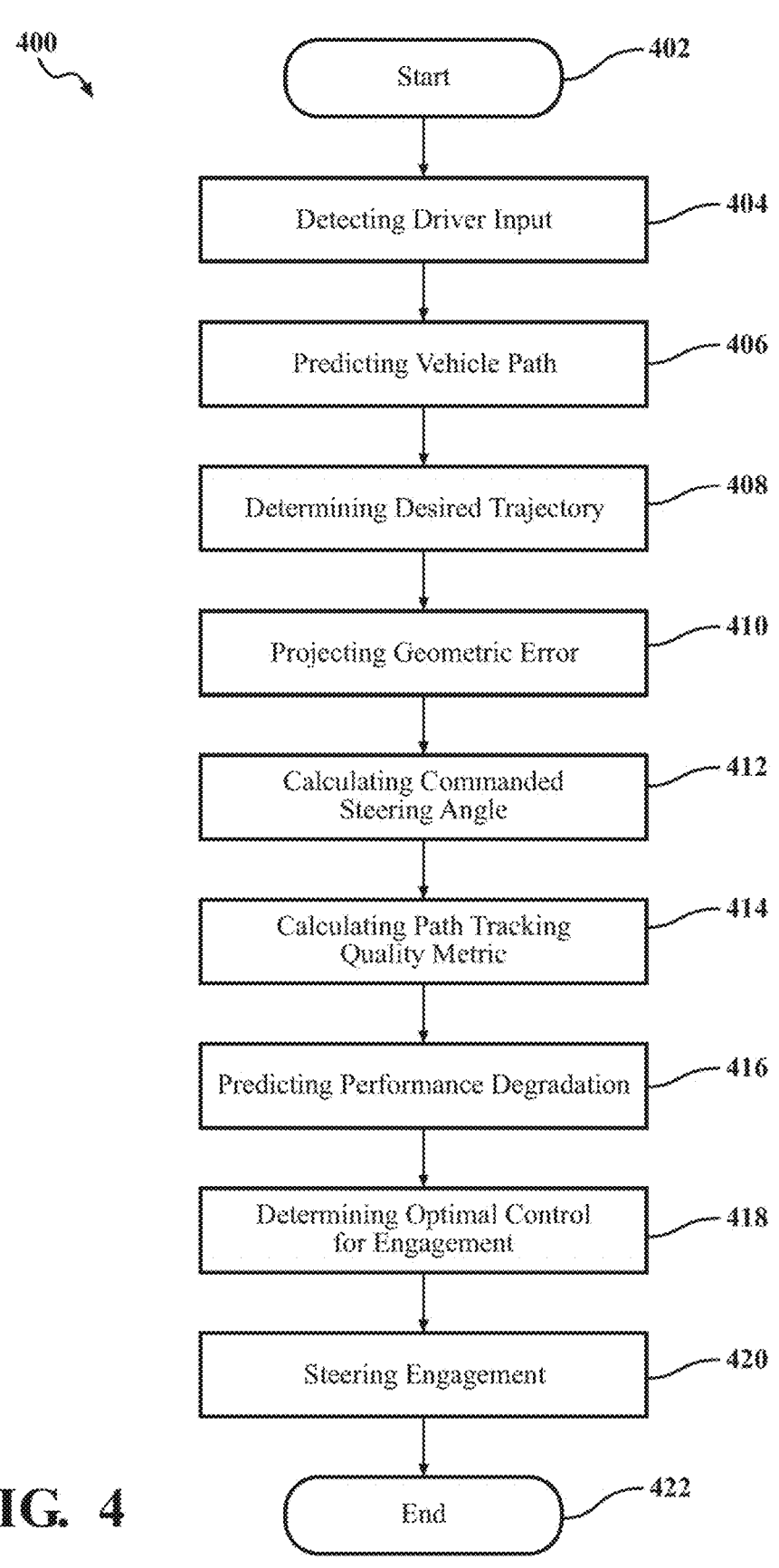
FIG. 4 is a flow diagram showing operations of the vehicle management system of FIG. 2A.

With reference to FIG. 4, a method 400 for determining whether engagement of a steering system of the vehicle 100 at standstill or low speed is necessary before a driving maneuver is initiated is provided. At 402, the method 400 is initiated. In practical terms, the method 400 may be initiated upon powering-up of the vehicle 100 by the vehicle operator.

At 404, a driver input to enable the automated driving system may be detected by the vehicle management system 110. For instance, the driver of the vehicle 100 may enable the automated driving system via the steering wheel 144 (e.g., pressing a button) or via the user interface 170.

At 406, the intended path 163 of the vehicle 100 may be generated with the automated driving module 162 with sensor data 123 of the sensor system 120.

At 408, the reference trajectory 164 may be determined at the automated driving module 162 and provided to the trajectory control module 161.

At 410, any geometric error with respect to the intended path 163 may be determined and provided to the MPC 200 for determining the calculated steering angle 201.

At 412, the commanded steering angle 165 may be determined based on the intended path of the vehicle.

At 414, the path tracking quality index 210 may be calculated. As mentioned above, the PTQI 210 may be desirable for determining whether the steering system should be engaged based on the commanded steering angle 165 or whether the initial road wheel angle 149a can be used to initiate a steering maneuver. Again, when the PTQI 210 is between 0.75 and 1 the driving maneuver is initiated with the initial steering angle. When the PTQI 210 is between 0.50 and 0.75, the vehicle steering system 140 is engaged to adjust the steering angle based on the commanded steering angle 165 before the driving maneuver is initiated. When the PTQI 210 is between 0 and 0.5, the vehicle management system 110 may be configured to instruct an operator of the vehicle 100 to manually adjust the steering angle based on the commanded steering angle 165 before the driving maneuver is initiated.

At 416, trajectory following may be affected by one or more factors such as road type and weather, for example. Evaluating one or more extraneous factors via the sensor system 120 and predicting any performance degradation may be desirable so that road wheel angle 149 may be adjusted accordingly.

At 418, the calculated steering angle 201 may be determined at the trajectory control module 161.

At 420, the vehicle 100 may or may not engage the steering system 140 to adjust the steering angle of the vehicle 100 before initiating a driving maneuver. In other words, whether the vehicle 100 or driver adjusts the road wheel angle 149 based on the commanded steering angle 165 may be achieved at 420. In standstill engagement vehicle scenarios (e.g., FIGS. 3A-3C) or in situation awareness engagement vehicle scenarios (FIG. 3D), the road wheel angle may or may not be adjusted based on the commanded steering angle 165.

The method 400 is completed at 422.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, causes the data processing hardware to perform operations comprising:

detecting a request to enable an automated driving system of a vehicle while the vehicle is at rest or at a low speed;

determining an intended path of the vehicle;

determining a road wheel angle of a front wheel of the vehicle while the vehicle is at rest or at a low speed;

calculating a desired steering angle based on the intended path;

calculating a commanded steering angle, the commanded steering angle being an input for a steering control module;

evaluating the road wheel angle of the front wheel of the vehicle while the vehicle is at rest or at a low speed versus the desired steering angle; and evaluating a path tracking quality index, the path tracking quality index being calculated based on predicted future vehicle states and intended future trajectory;

initiating a driving maneuver with the road wheel angle of the front wheel of the vehicle while the vehicle is at rest or at the low speed when the path tracking quality index is between a first threshold and a second threshold; and adjusting, if the path tracking quality index is less than the second threshold and greater than or equal to a third threshold, the road wheel angle via a vehicle steering system, based on the commanded steering angle before the driving maneuver is initiated.

2. The method of claim 1, wherein adjusting the road wheel angle further comprises a vehicle steering system that is configured for adjusting the road wheel angle of the front wheel of the vehicle while the vehicle is at rest or at a low speed before initiating the driving maneuver.

3. The method of claim 1, wherein adjusting the road wheel angle of the front wheel of the vehicle while the vehicle is at rest or at a low speed before initiating the driving maneuver further comprises instructing an operator of the vehicle to manually adjust the road wheel angle based on the commanded steering angle before initiating the driving maneuver.

4. The method of claim 1, wherein when the path tracking quality index is greater than a fourth threshold and less than a third threshold a vehicle management system configured to instruct an operator of the vehicle instructs the operator to manually adjust the road wheel angle based on the commanded steering angle before the driving maneuver is initiated.

5. The method of claim 1, wherein evaluating the path tracking quality index further includes assessing the road wheel angle of the front wheel of the vehicle while the vehicle is at rest or at a low speed using a predictive controller and a low-speed vehicle model.

6. A system comprising:

data processing hardware; and memory hardware in communication with the data processing hardware, the memory hardware storing instructions that, when executed on the data processing hardware, cause the data processing hardware to perform operations comprising:

detecting a request to enable an automated driving system of a vehicle while the vehicle is at rest or at a low speed;

determining an intended path of the vehicle;

determining a road wheel angle of a front wheel of the vehicle while the vehicle is at rest or at a low speed;

calculating a desired steering angle based on the intended path;

calculating a commanded steering angle, the commanded steering angle being an input for a steering control module;

evaluating the road wheel angle of the front wheel of the vehicle while the vehicle is at rest or at a low speed versus the desired steering angle;

evaluating a path tracking quality index, the path tracking quality index being calculated based on predicted future vehicle states and intended future trajectory;

initiating a driving maneuver with the road wheel angle of the front wheel of the vehicle while the vehicle is at rest or at the low speed when the path tracking quality index is between a first threshold and a second threshold; and adjusting, if the path tracking quality index is less than the second threshold and greater than or equal to a third threshold, the road wheel angle, via a vehicle steering system, based on the commanded steering angle before the driving maneuver is initiated.

7. The system of claim 6, wherein adjusting the road wheel angle before initiating the driving maneuver comprises instructing an operator of the vehicle to manually adjust the road wheel angle based on the commanded steering angle before initiating the driving maneuver.

8. The system of claim 6, wherein when the path tracking quality index is greater than a fourth threshold and less than a third threshold a vehicle management system configured to instruct an operator of the vehicle instructs the operator to manually adjust the road wheel angle based on the commanded steering angle before the driving maneuver is initiated.

9. A vehicle management system comprising:

a steering system configured to adjust a road wheel angle of a front wheel of a vehicle;

data processing hardware; and memory hardware in communication with the data processing hardware, the memory hardware storing instructions that, when executed on the data processing hardware, cause the data processing hardware to perform operations comprising:

detecting a request to enable an automated driving system of a vehicle while the vehicle is at rest or at a low speed;

determining an intended path of the vehicle;

determining the road wheel angle of the front wheel of the vehicle while the vehicle is at rest or at a low speed;

calculating a desired steering angle based on the intended path;

calculating a commanded steering angle, the commanded steering angle being an input for a steering control module;

evaluating the road wheel angle of the front wheel of the vehicle while the vehicle is at rest or at a low speed versus the desired steering angle;

evaluating a path tracking quality index, the path tracking quality index being calculated based on predicted future vehicle states and intended future trajectory;

initiating a driving maneuver with the road wheel angle of the front wheel of the vehicle while the vehicle is at rest or at the low speed when the path tracking quality index is between a first threshold and a second threshold; and adjusting, if the path tracking quality index is less than the second threshold and greater than or equal to a third threshold, the road wheel angle, via the steering system, based on the commanded steering angle before the driving maneuver is initiated.

10. The system of claim 9, wherein adjusting the road wheel angle before initiating the driving maneuver comprises instructing an operator of the vehicle to manually adjust the road wheel angle based on the commanded steering angle before initiating the driving maneuver.

11. The system of claim 9, wherein when the path tracking quality index is greater than a fourth threshold and less than the third threshold a vehicle management system configured to instruct an operator of the vehicle instructs the operator to manually adjust the road wheel angle based on the commanded steering angle before the driving maneuver is initiated.

12. The method of claim 1, wherein evaluating the path tracking quality index comprises computing the path tracking quality index as a weighted product of (i) lateral deviation, (ii) merge time, and (iii) the road wheel angle.

13. The method of claim 1, wherein evaluating the path tracking quality index further comprises using sensor data from a sensor system of the vehicle to determine predicted future vehicle states and intended future trajectory.

14. The method of claim 1, wherein calculating the commanded steering angle further comprises generating the commanded steering angle based on a comparison between the road wheel angle of the front wheel of the vehicle while the vehicle is at rest or at a low speed and the desired steering angle, and providing the commanded steering angle as an input to the steering control module.

15. The method of claim 5, wherein the predictive controller is configured to provide the commanded steering angle that minimizes deviation from a reference trajectory while accounting for system constraints and predicted vehicle behavior at low speeds.

16. The system of claim 6, wherein evaluating the path tracking quality index comprises computing the path tracking quality index as a weighted product of (i) lateral deviation, (ii) merge time, and (iii) the road wheel angle.

17. The system of claim 6, wherein evaluating the path tracking quality index further includes assessing the road wheel angle of the front wheel of the vehicle while the vehicle is at rest or at a low speed using a predictive controller and a low-speed vehicle model.

18. The system of claim 17, wherein the predictive controller is configured to provide the commanded steering angle that minimizes deviation from a reference trajectory while accounting for system constraints and predicted vehicle behavior at low speeds.

19. The system of claim 9, wherein evaluating the path tracking quality index comprises computing the path tracking quality index as a weighted product of (i) lateral deviation, (ii) merge time, and (iii) the road wheel angle.

20. The system of claim 9, wherein evaluating the path tracking quality index further includes assessing the road wheel angle of the front wheel of the vehicle while the vehicle is at rest or at a low speed using a predictive controller and a low-speed vehicle model.

* * * * *